(12) United States Patent
Williamson et al.

(10) Patent No.: US 10,284,435 B2
(45) Date of Patent: May 7, 2019

(54) METHOD TO VISUALIZE END USER RESPONSE TIME

(71) Applicant: Fluke Corporation, Everett, WA (US)

(72) Inventors: Michael Allen Williamson, Colorado Springs, CO (US); Stefan Pracht, Colorado Springs, CO (US); Joseph Morales, Colorado Springs, CO (US); Thomas Doumas, Colorado Springs, CO (US)

(73) Assignee: AIRMAGNET, INC., Westford, MA (US)

( * ) Notice: Subject to any disclaimer, the term of this patent is extended or adjusted under 35 U.S.C. 154(b) by 262 days.

(21) Appl. No.: 14/523,315

(22) Filed: Oct. 24, 2014

(65) Prior Publication Data
US 2015/0121187 A1    Apr. 30, 2015

Related U.S. Application Data

(60) Provisional application No. 61/897,645, filed on Oct. 30, 2013.

(51) Int. Cl.
*H04L 12/24*    (2006.01)
(52) U.S. Cl.
CPC .......... *H04L 41/22* (2013.01); *H04L 41/0631* (2013.01); *H04L 41/142* (2013.01)
(58) Field of Classification Search
CPC .... H04L 41/142; H04L 41/22; H04L 41/0631
(Continued)

(56) References Cited

U.S. PATENT DOCUMENTS 7,290,048 B1 *  10/2007  Barnett ............... G06F 11/3495
                                                       709/223
10,142,197 B2 *  11/2018  Nakazawa ............ H04L 43/045
(Continued)

FOREIGN PATENT DOCUMENTS

EP      3211831 A1 *  8/2017  ......... H04L 41/0631

OTHER PUBLICATIONS

"Making Back-to-Back Graphs in Excel," Evergreen Data, <http://stephanieevergreen.com/making-back-to-back-graphs-in-excel/>, published prior to: Dec. 17, 2012.*
(Continued)

*Primary Examiner* — Stephen S Hong
*Assistant Examiner* — Broderick Anderson
(74) *Attorney, Agent, or Firm* — Locke Lord LLP; Scott D. Wofsy; Christopher J. Capelli

(57) ABSTRACT

A method for visual representation of EURT is provided. Measurements of performance parameters are collected. Each of the performance parameters corresponds to at least one performance problem domain. The performance parameters include at least a first, second and third parameters. A correlation between at least two of performance parameters is determined. A first graph having a first region representing the first parameter and having a second region representing the second parameter is presented to a user. The first and second regions extend in substantially opposing directions. A second graph representing the third parameter based on the determined correlation between data elements falling within each of the respective performance problem domains is simultaneously presented to the user. The first, second and third parameters are components of the EURT.

7 Claims, 5 Drawing Sheets

(58) Field of Classification Search
USPC .......................................................... 715/227
See application file for complete search history.

(56) References Cited

U.S. PATENT DOCUMENTS

| | | | |
|---|---|---|---|
| 2008/0092122 A1* | 4/2008 | Caprihan | G06F 11/3409 717/127 |
| 2010/0211673 A1* | 8/2010 | Kosbab | H04L 41/5009 709/224 |
| 2013/0019008 A1* | 1/2013 | Jorgenson | H04L 41/12 709/224 |

OTHER PUBLICATIONS

"How to Make a Heatmap—a Quick and Easy Solution," Nathan Yau, FlowingData, <http://flowingdata.com/2010/01/21/how-to-make-a-heatmap-a-quick-and-easy-solution>, published prior to Jan. 15, 2012.*

* cited by examiner

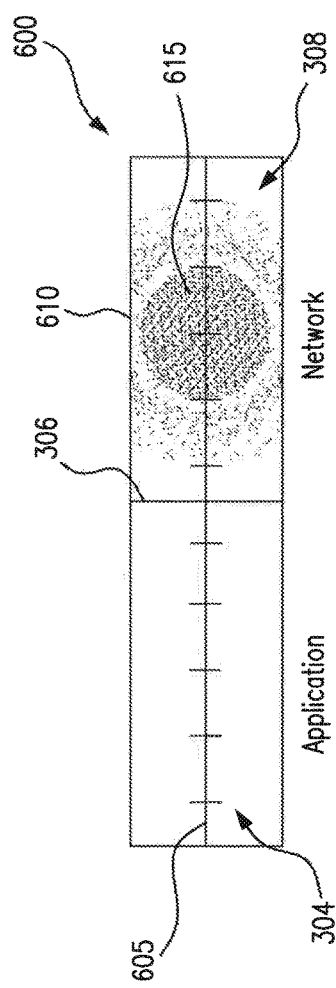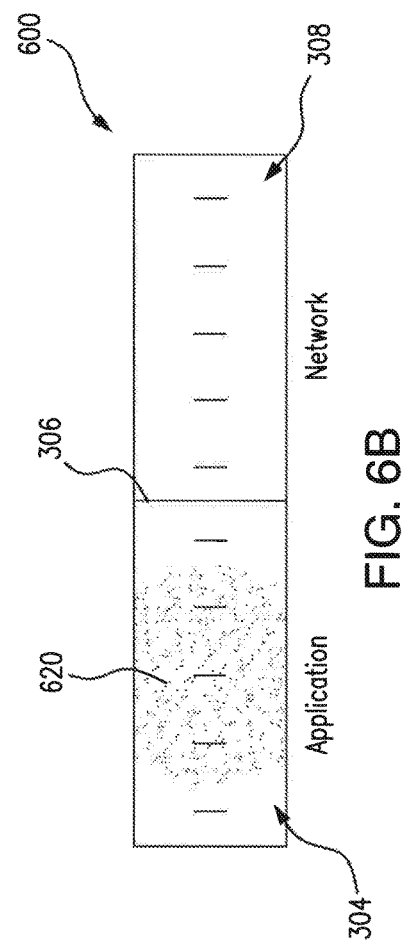

METHOD TO VISUALIZE END USER RESPONSE TIME

CROSS REFERENCE TO RELATED APPLICATIONS

This application claims the benefit of the filing date of U.S. Provisional Patent Application Ser. No. 61/897,645 titled "Method to visualize end user response time" and filed Oct. 30, 2013.

FIELD OF THE INVENTION

This specification is directed, in general, to data visualization of network monitoring data, and, more particularly, to a method for visualizing end user response time.

BACKGROUND OF THE INVENTION

Modern applications are characterized by multiple components deployed across multiple network tiers accessed by users across a network. Examples of applications include enterprise applications, such as Enterprise Resource Planning (ERP), Customer Relationship Management (CRM), Supply Chain Management (SCM), and Online Banking, Brokerage, Insurance and Retailing applications. An application typically provides a variety of business functions that users may execute. For example, an online stock trading application may provide some of the following business functions: log in, display account status, retrieve stock prospectus, sell stock, buy stock and log out.

When a user executes such a business function, a sequence of transactions is performed by the application, with each transaction consisting of a source node transmitting a request (via network message) to a destination node often on another tier, and perhaps waiting for a reply message. The destination node processes the request and in the processing consumes local (server) resources such as CPU, disk input/output, and memory and may generate subsequent requests (subtransactions) to other nodes.

The time that elapses between the user executing the business function (submitting his or her request) and the display of the results on the user's workstation is called the end user response time. The end user response time is typically the most critical measure of end user satisfaction with application performance. If the response times are too long, end users will be unsatisfied and many will take their business elsewhere.

In order to maintain and improve good end user performance, application and system managers must understand the current performance of their applications, be able to identify and predict current and future performance problems, and evaluate potential solutions to those problems. Any given application performance problem is a reflection of application performance, data size, network performance and network congestion. Determining which domain of responsibility a particular application performance problem falls into is a complex evaluation of the constituent parts of the end user response time measure.

Accordingly, it would be advantageous to provide visual representations of the constituent parts of end user response time measurements that enable the user to identify the cause or causes of various performance issues.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, a method for visual representation of end user response time is described in which an illustrated embodiment includes collecting measurements of a plurality of performance parameters. Each of the plurality of performance parameters corresponds to at least one performance problem domain. The plurality of performance parameters includes at least a first parameter, a second parameter and a third parameter. A correlation between at least two of the plurality of performance parameters is determined. A first graph having a first region representing said first parameter and having a second region representing said second parameter is presented to a user. The first and second regions extend in substantially opposing directions. A second graph representing the third parameter based on the determined correlation between data elements falling within each of the respective performance problem domains is simultaneously presented to the user. The first, second and third parameters are components of the end user response time.

In another aspect, a computer program product for visual representation of end user response time is provided. The computer program product includes one or more computer-readable storage devices and a plurality of program instructions stored on at least one of the one or more computer-readable storage devices. The plurality of program instructions includes program instructions to collect measurements of a plurality of performance parameters. Each of the plurality of performance parameters corresponds to at least one performance problem domain. The plurality of performance parameters includes at least a first parameter, a second parameter and a third parameter. The plurality of program instructions further includes program instructions to determine a correlation between at least two of the plurality of performance parameters. The plurality of program instructions further includes program instructions to present a first graph having a first region representing said first parameter and having a second region representing said second parameter. The first and second regions extend in substantially horizontally opposing directions. The plurality of program instructions further includes program instructions to simultaneously present a second graph representing the third parameter based on the determined correlation between data elements falling within each of the respective performance problem domains. The first, second and third parameters are components of the end user response time.

Additional aspects may include generating one or more heat maps representing one or more performance problems based on the analysis of the plurality of performance parameters. Additionally, the step of presenting the second graph may further comprise dynamically adjusting a position of the second bar graph with respect to the axis separating two different performance problem domains.

BRIEF DESCRIPTION OF THE DRAWINGS

The accompanying appendices and/or drawings illustrate various, non-limiting, examples, inventive aspects in accordance with the present disclosure:

FIGS. 6A and 6B illustrate examples of heat map representation of network and application performance problems, respectively, in accordance with yet another embodiment of the present invention.

DETAILED DESCRIPTION OF CERTAIN EMBODIMENTS

Figure 1:
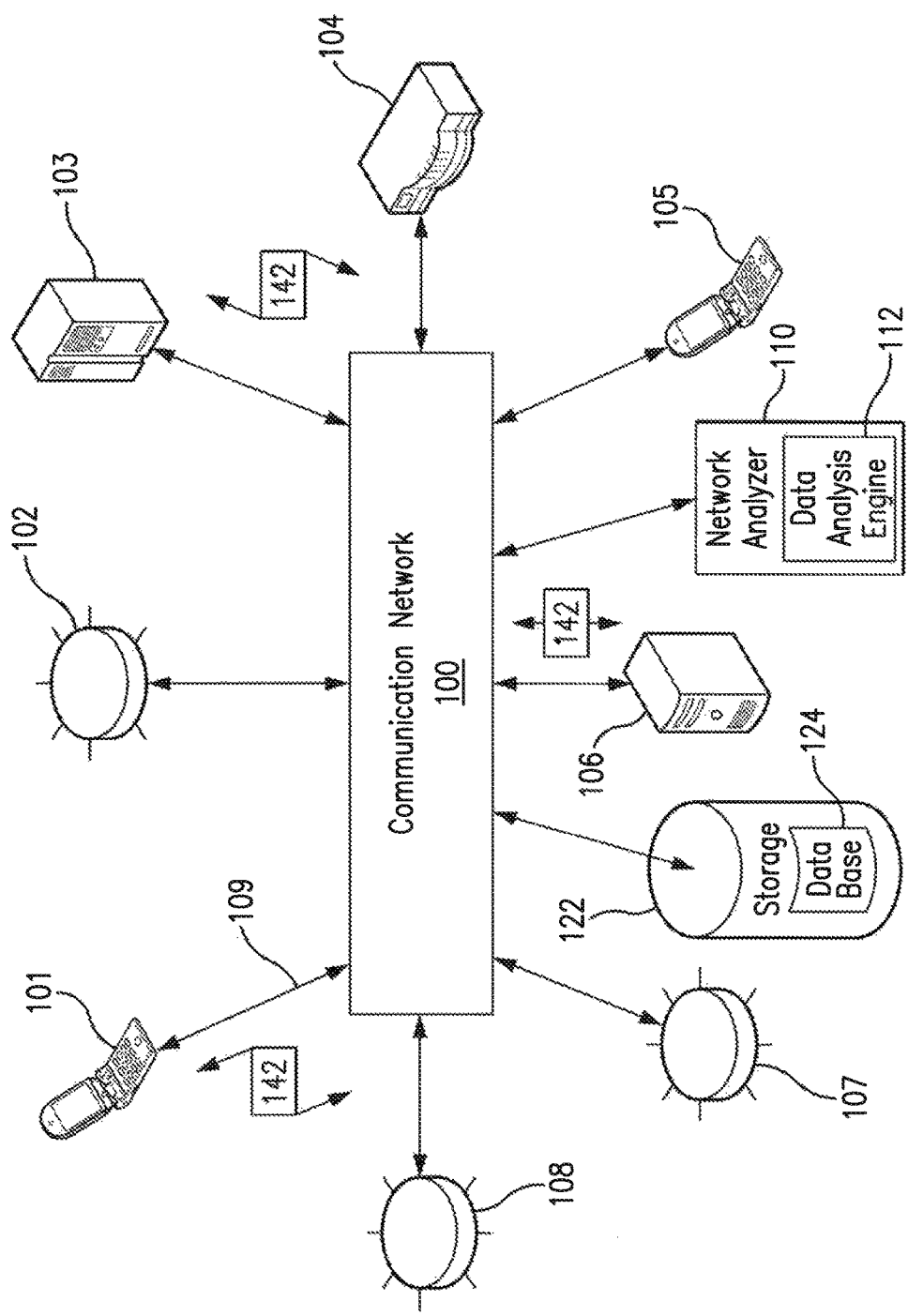
FIG. 1 illustrates an example communication network in accordance with an illustrated embodiment.

The present invention is now described more fully with reference to the accompanying drawings, in which illustrated embodiments of the present invention is shown wherein like reference numerals identify like elements. The present invention is not limited in any way to the illustrated embodiments as the illustrated embodiments described below are merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, exemplary methods and materials are now described. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the invention based on the above-described embodiments. Accordingly, the invention is not to be limited by what has been particularly shown and described, except as indicated by the appended claims.

Turning now descriptively to the drawings, in which similar reference characters denote similar elements throughout the several views, FIG. 1 depicts an exemplary communication network 100 in which bellow illustrated embodiments may be implemented.

It is to be understood a communication network 100 is a geographically distributed collection of nodes interconnected by communication links and segments for transporting data between end nodes, such as smart phones, pads, personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

The exemplary communication network 100 of FIG. 1 illustratively comprises nodes/devices 101-108 (e.g., sensors 102, client computing devices 103, smart phone devices 101, 105, servers 106, routers 107, switches 108 and the like) interconnected by various methods of communication. For instance, the links 109 may be wired links or may comprise a wireless communication medium, where certain nodes are in communication with other nodes, e.g., based on distance, signal strength, current operational status, location, etc. Moreover, each of the devices can communicate data packets (or frames) 142 with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, etc. may be used in the computer network, and that the view shown herein is for simplicity. Also, while the embodiments are shown herein with reference to a general network cloud, the description herein is not so limited, and may be applied to networks that are hardwired.

Network monitoring is an important operational scheme for network operators. According to an embodiment of the present invention, a network analyzer device 110 is also communicatively connected to the network 100. The network analyzer device 110 may include a user interface (not shown in FIG. 1) that enables a user to interact with the network analyzer device 110, to operate the network analyzer device 110, and to obtain data therefrom, whether at the location of installation or remotely. Alternatively, the client computing device 103 may include the user interface communicatively coupled to the network analyzer device 110.

According to an embodiment of the present invention, network analyzer device 110 may comprise, or otherwise may cooperate with a data analysis engine 112. Data analysis engine 112 may comprise program instructions stored on one or more computer-readable storage devices, which may include internal storage on the network analyzer device 110.

Data analysis engine 112 may be configured to monitor traffic on the communication network 100, as well as to perform various testing and measurement operations, to conduct analysis of collected data, to present data to a user, and the like. In an embodiment of the present invention, data analysis engine 112 may be, for example, a computer program or program component capable of providing certain information about end user's response time, as described in more detail below. Data gathered, generated, and maintained for use by the data analysis engine 112 may be kept in the internal storage of the network analyzer device 110 or in one or more databases 124 of a storage unit 122.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
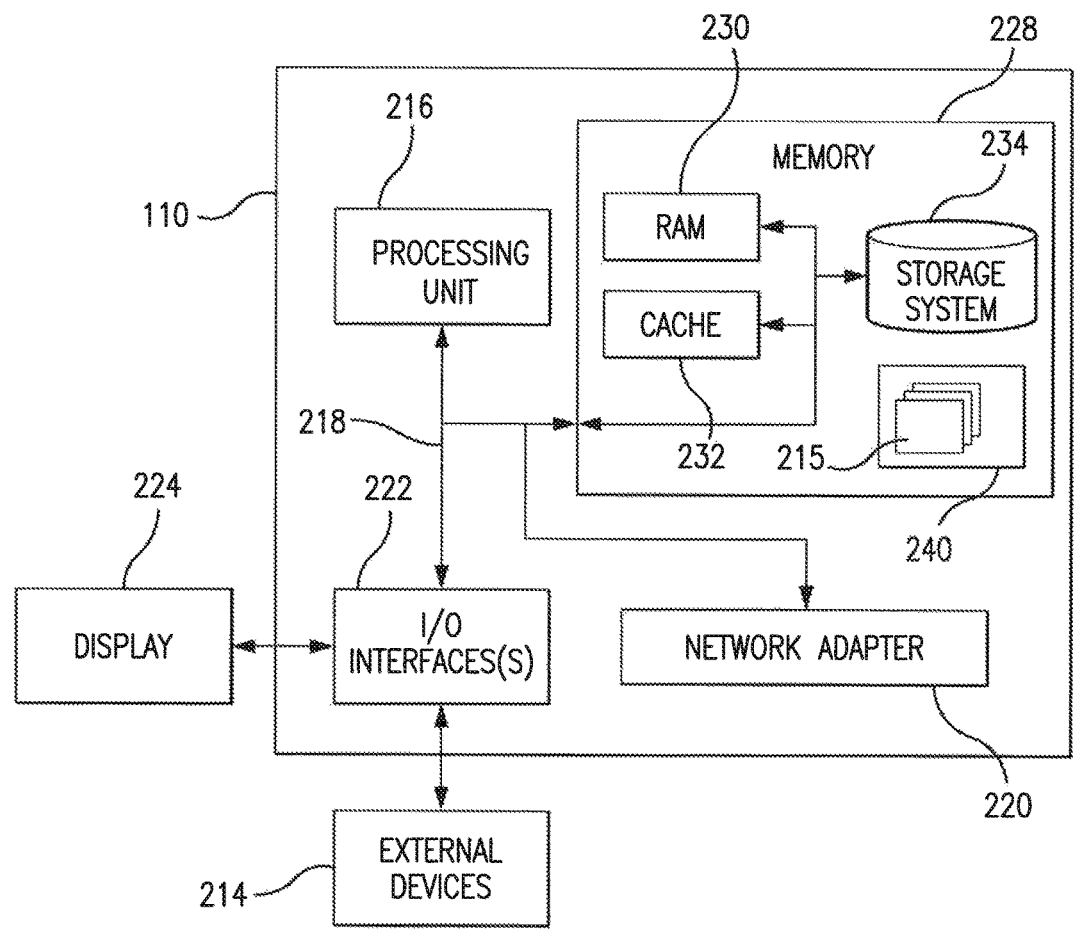
FIG. 2 illustrates internal and external components of a network analyzer device/node in accordance with an illustrative embodiment of the present invention.

FIG. 2 is a schematic block diagram of an example network analyzer device 110 that may be used (or components thereof) with one or more embodiments described herein. Network analyzer device 110 is only one example of a suitable system and is not intended to suggest any limitation as to the scope of use or functionality of embodiments of the invention described herein. Regardless, network analyzer device 110 is capable of being implemented and/or performing any of the functionality set forth herein.

Network analyzer device 110 is operational with numerous other general purpose or special purpose computing system environments or configurations. Examples of well-known computing systems, environments, and/or configurations that may be suitable for use with network analyzer device 110 include, but are not limited to, personal computer systems, server computer systems, thin clients, thick clients, hand-held or laptop devices (including mobile devices such as smart phones and tablets), multiprocessor systems, microprocessor-based systems, set top boxes, programmable consumer electronics, network PCs, minicomputer systems, mainframe computer systems, and distributed data processing environments that include any of the above systems or devices, and the like.

Network analyzer device 110 may be described in the general context of computer system-executable instructions, such as program modules, being executed by a computer system. Generally, program modules may include routines, programs, objects, components, logic, data structures, and so on that perform particular tasks or implement particular abstract data types. Network analyzer device 110 may be practiced in distributed data processing environments where tasks are performed by remote processing devices that are linked through the communication network 100. In a distributed data processing environment, program modules may be located in both local and remote computer system storage media including memory storage devices.

Network analyzer device 110 is shown in FIG. 2 in the form of a general-purpose computing device. The components of device 110 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Network analyzer device 110 typically includes a variety of computer system readable media. Such media may be any available media that is accessible by device 110, and it includes both volatile and non-volatile media, removable and non-removable media.

System memory 228 can include computer system readable media in the form of volatile memory, such as random access memory (RAM) 230 and/or cache memory 232. Network analyzer device 110 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 215, such as data analysis engine module 112 described below, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 215 generally carry out the functions and/or methodologies of embodiments of the invention as described herein.

Network analyzer device 110 may also communicate with one or more external devices 214 such as a keyboard, a pointing device, a display 224, etc.; one or more devices that enable a user to interact with network analyzer device 110; and/or any devices (e.g., network card, modem, etc.) that enable network analyzer device 110 to communicate with one or more other computing devices. Such communication can occur via Input/Output (I/O) interfaces 222. Still yet, device 110 can communicate with one or more networks such as a local area network (LAN), a general wide area network (WAN), and/or a public network (e.g., the Internet) via network adapter 220. As depicted, network adapter 220 communicates with the other components of network analyzer device 110 via bus 218. It should be understood that although not shown, other hardware and/or software components could be used in conjunction with device 110. Examples, include, but are not limited to: microcode, device drivers, redundant processing units, external disk drive arrays, RAID systems, tape drives, and data archival storage systems, etc.

FIGS. 1 and 2 are intended to provide a brief, general description of an illustrative and/or suitable exemplary environment in which embodiments of the below described present invention may be implemented. FIGS. 1 and 2 are exemplary of a suitable environment and are not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

The application of visualization techniques to data-intensive tasks and analysis is generally useful for the purpose of facilitating data understanding and the completion of data-dependent tasks (such as troubleshooting enterprise application problems and optimizing computer network performance). The term "visualization" here refers to the transformation of numerical data into graphical objects generated by computer software and viewed by the software user. Advantageously, various embodiments of the present invention utilize visualization techniques to present complex data in a concise and comprehensible way.

In many enterprises different groups of people support different parts of enterprise applications. Typically, people are divided into groups based on domains of responsibility. For example, network engineering experts may not be best to diagnose and resolve enterprise application problems. On the other hand, the application support team may be ill suited to diagnose and resolve network issues. Moreover, often an issue experienced by a user of an enterprise application is merely a symptom of a different problem. Any given enterprise application performance criteria, including but not limited to, the amount of time it takes a network application to respond to a user request, also referred to herein as End User Response Time (EURT), can be influenced by a variety of different factors. For instance, such factors may include application performance, server response time, the size of data being transferred between the server and a client device, client device's response time, network performance, the speed of all network devices contributing to the overall response time, the level of loading or congestion within the network, and network routing protocol optimization, among many other factors. Accordingly, determination whether a problem falls within a particular domain of a responsibility may involve a complicated evaluation of the components of EURT. As used herein, the term "EURT" refers to a performance measurement indicative of the quality of user's experience with an enterprise application.

For the purpose of illustration of various embodiments of the present invention, EURT comprises three components, more specifically, Application Response Time (ART), Network Response Time (NRT) and Data Transfer Time (DTT). ART is one of key aspects of application performance monitoring and is defined as the time it takes an enterprise application to respond to user requests. Network Response Time (NRT) addresses the time it takes for a data element (a packet or set of packets) to traverse the network from the end user to the network location of the application processing hardware (virtual or otherwise) and back. A number of elements factor into this, including the payload size, overall network bandwidth available to the user/application, the maximum transmission unit (MTU) along the data path, and the round trip response time (RTT)—the time it takes data packets to simply traverse the network including any switching or routing latencies. DTT refers to a time taken for a data transfer between a source network node and a destination node. While a large ART value is typically indicative of an application problem and a large NRT value typically indicates a network issue, a large DTT value may be due to either of the potential sources of problems (i.e., applications issue and network issue). Advantageously, various embodiments of the present invention present visualization of the constituent components of EURT in a manner enabling the user to identify the cause or causes of poor EURT measurements.

Figure 3:
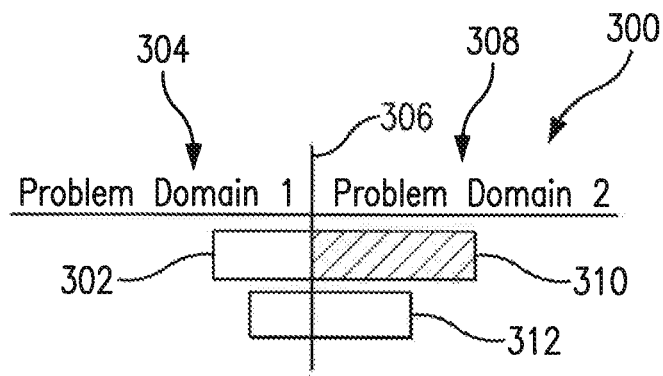
FIG. 3 is an exemplary visualization component illustrating problem domain data affinity in accordance with illustrative embodiments of the present invention.

For illustrative purposes only, various embodiments of the present invention separate application issues and network issues into different problem domains. Referring now to FIG. 3, there is shown an exemplary visualization component 300 illustrating generic problem domain data affinity in accordance with illustrative embodiment of the present invention. In general terms, a data set may comprise an aggregation of subsets corresponding to various data classes. Thus, graphical representation of such data set may include various components representing constituent subsets. More specifically, as shown in FIG. 3, two different graphs may be used to show data measurements falling within two different problem domains 304 and 308. For instance, a first subset of data elements might belong entirely to a first problem domain 304, while a second subset of data might belong entirely to a second problem domain 308. However, a third subset of data may partially belong to each of the respective problem domains 304 and 308. Accordingly, the first graph shown in FIG. 3 is illustrated as having two separate regions 302 and 310 representing the first and second subsets. More specifically, a first region 302 represents the aforementioned first subset, while a second region 310 represents the second subset. In the example illustrated in FIG. 3 both graphs comprise horizontal bar graphs. It is noted that in FIG. 3, the first problem domain 304 is visually separated from the second problem domain 308 by a vertical axis 306. The aforementioned third data subset is represented by a second horizontal bar graph 312. It is noted that according to an embodiment of the present invention, a relative position of the second bar graph 312 with respect to the vertical axis 306 is calculated based on the number of data elements falling within each of the respective problem domains 304 and 308.

Figure 4:
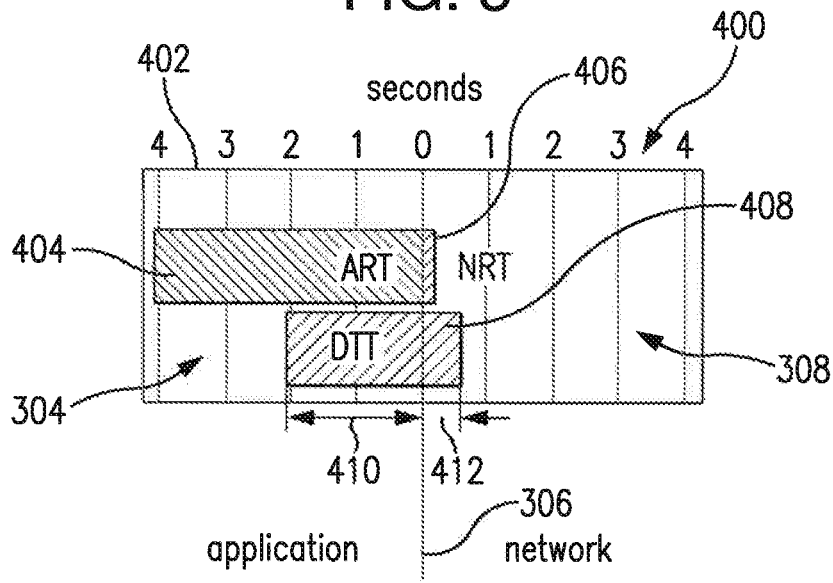
FIG. 4 is an exemplary visualization component presenting an end user response time in accordance with an embodiment of the present invention.
Figure 5:
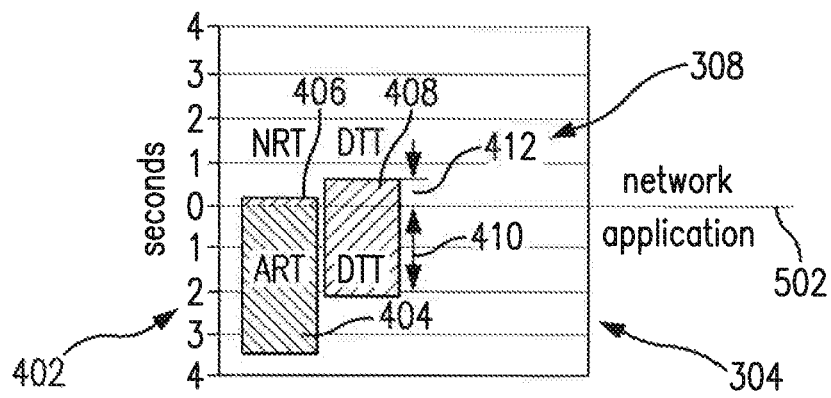
FIG. 5 is an exemplary visualization component presenting an end user response time in accordance with another embodiment of the present invention.

It is to be understood, while the embodiments of the present invention illustrated by FIGS. 4 and 5 are shown herein with reference to monitoring and analysis of networking environment, the description herein is not so limited, and may be applied to a variety of systems such as water transportation system, air transportation system, electrical grid, and the like.

FIG. 4 is an exemplary visualization component 400 presenting an end user response time in the communication network 100, in accordance with an embodiment of the present invention. In this illustrative example, vertical axis 306 is displayed to separate application issues 304 (i.e., first problem domain) from network issues 308 (i.e., second problem domain). A first horizontal bar graph includes two regions 404 and 406 extending in substantially horizontally opposing directions with respect to the vertical axis 306. In this case, a first region 404 represents an ART value indicative of application performance for a predetermined time interval (e.g., user selected interval), while a second region 406 represents a NRT value indicative of network performance for the predetermined time interval.

A second horizontal bar graph 408 shown in FIG. 4 represents a DTT value. As previously indicated, DTT refers to a time taken for a data transfer between the network nodes. In communication networks employing TCP protocols, typically, there are two major factors influencing DTI values.

One of the factors influencing DTT values includes zero window events. As will be appreciated by one skilled in the art, the TCP protocol provides a reliable transport mechanism between two nodes on the network 100. TCP transmissions operate in accordance with a technique known as positive acknowledgement with retransmission. Thus, TCP retransmissions contribute to delays affecting DTI as a result of the network's configuration or utilization (or both).

As described below in conjunction with FIG. 7, data analysis engine 112 determines a ratio that represents the number of TCP zero window events relative to the number of TCP retransmissions during the predetermined time interval. Based on the determined ratio, data analysis engine 112 dynamically adjusts the relative position of the second horizontal bar graph 408 with respect to the vertical axis 306. It is noted that the distances 410 and 412 to which the respective parts of the second horizontal bar 408 extend from the vertical axis 306 depend on the determined ratio.

FIG. 5 is an exemplary visualization component presenting an end user response time in the communication network 100, in accordance with another embodiment of the present invention. In this illustrative embodiment, application related problem domain 304 is separated from network related problem domain 308 by a horizontal axis 502. In this case, parameters representing end user response time are presented using vertical bar graphs. A first vertical bar graph includes two regions 404 and 406 extending in substantially vertically opposing direction with respect to the horizontal axis 502. As noted above, the first region 404 represents the ART value indicative of application performance for the predetermined time interval, while the second region 406 represents the NRT value indicative of network performance for the predetermined time interval.

A second vertical bar graph 408 shown in FIG. 5 represents the DTT value. In this embodiment, data analysis engine 112 dynamically adjusts the relative position of the second vertical bar graph 408 with respect to the horizontal axis 502 based on the determined ratio of TCP zero window events relative to the number of TCP retransmissions. It is noted that the distances 410 and 412 to which the respective parts of the second vertical bar 408 extend from the horizontal axis 502 depend on the aforementioned ratio.

FIGS. 6A and 6B illustrate examples of heat map representation of network and application performance problems, respectively, in accordance with yet another embodiment of the present invention. FIGS. 6A and 6B include exemplary visualization components 600 presenting corresponding heat map representations 610 and 620. In these illustrative examples, vertical axis 306 is displayed to separate application issues 304 (i.e., first problem domain) from network issues 308 (i.e., second problem domain). In one embodiment, heat map representations include a circle corresponding to a particular performance problem. In one embodiment, heat map representations are generated based on the analysis of the plurality of performance parameters, such as constituent components of EURT and other TCP measurements discussed above, to indicate both affinity and intensity of the corresponding performance problem. Specifically, positioning of the heat map representations 610 and 620 indicates what problem domain 304, 308 the depicted performance problem belongs to. Additionally, the visualization components 600 may be capable of scaling the relative size (i.e. the degree to which the issue belongs to a domain) of different performance issues by using a scale presented along a vertical axis 605.

It is noted that each heat map representation 610, 620 may be displayed in one of multiple different manners based on the usage of the analysis of the performance parameters. In one or more embodiments, these multiple different manners include color-coding the circles using various color hues to indicate the intensity of corresponding performance issue. In the examples of FIGS. 6A and 6B, first heat map representation 610 and second heat map representation 620 are generated so that the backgrounds of the circles are color-coded using the different color hues. For example, an area of "high heat" 615 (e.g., represented as red in an actual heat map) indicates a significant network issue, and the second heat map representation 620 entirely consists of an area of "low heat" (e.g., represented as blue in the actual heat map) indicates a relatively insignificant application performance problem. Alternatively, rather than color-coding the backgrounds of the circles, the color intensities can be used in different manners, such as used to color-code the circumferences of the circles, and so forth.

Figure 7:
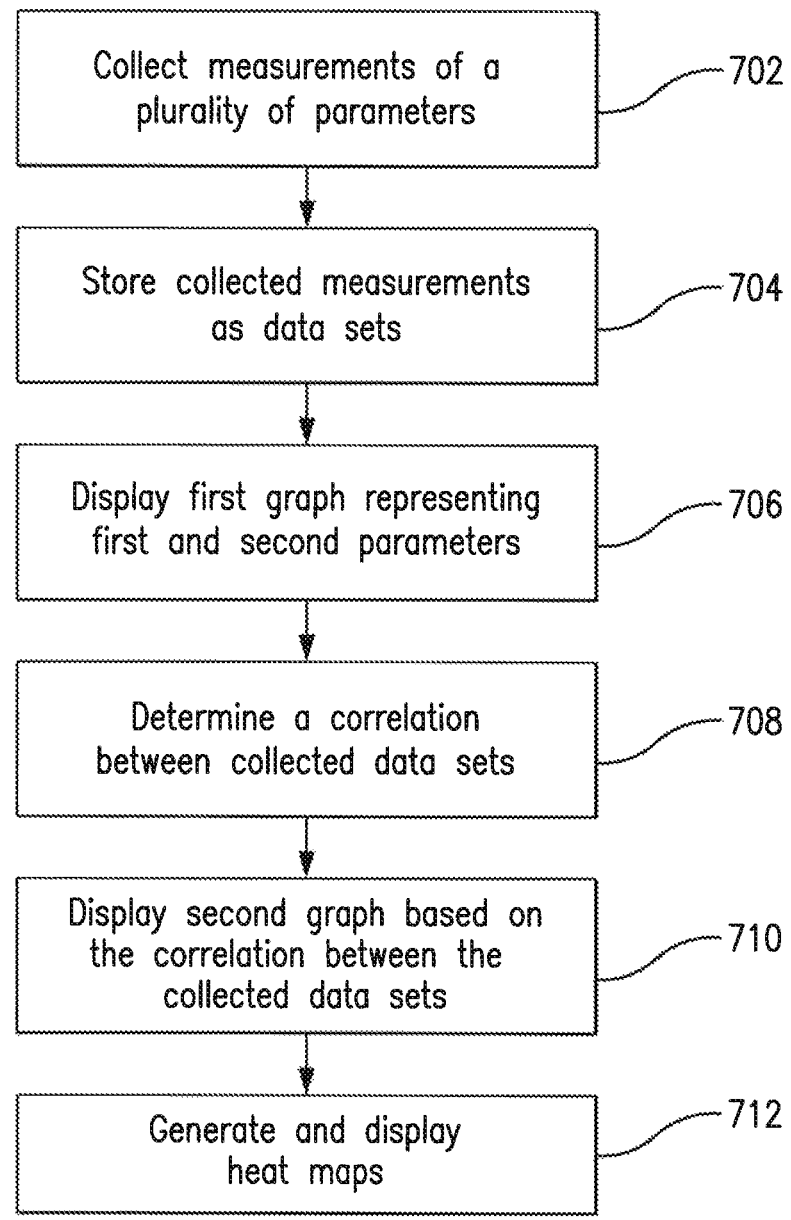
FIG. 7 is a flow diagram of operational steps of the data analysis engine of FIG. 1 in accordance with an illustrative embodiment of the present invention.

FIG. 7 is a flow diagram of operational steps of the data analysis engine 112 of FIG. 1 in accordance with an illustrative embodiment of the present invention. Before turning to description of FIG. 7, it is noted that the flow diagram in FIG. 7 shows examples in which operational steps are carried out in a particular order, as indicated by the lines connecting the blocks, but the various steps shown in these diagrams can be performed in any order, or in any combination or sub-combination. It should be appreciated that in some embodiments some of the steps described below may be combined into a single step. In some embodiments, one or more steps may be omitted. In some embodiments, one or more additional steps may be performed. As will be appreciated by one skilled in the art, aspects of the present invention may be embodied as a method or computer program product.

At 702, data analysis engine 112 obtains measurements of a plurality performance related parameters at a predetermined sampling rate. For instance, if data analysis engine 112 monitors the communication network 100 shown in FIG. 1, data analysis engine 112 preferably periodically measures parameters including, but not limited to, client data transfer time, server response time, server data transfer time, and the like. Moreover, if the monitored network 100 uses a TCP protocol, data analysis engine 112 preferably also collects information related to server's RTT and TCP zero window events. In an embodiment of the present invention, data analysis engine 112 determines the collection time for each data point.

At 704, data analysis engine 112 preferably stores collected information as measurement data sets. In an embodiment of the present invention, data analysis engine 112 stores gathered data in one or more databases 124 of the storage unit 122. Data analysis engine 112 preferably associates each data set with a particular performance related parameter.

At 706, in response to a user request to present information of interest (i.e., end user response time) for a selected time interval, data analysis engine 112 retrieves information corresponding to first and second parameters corresponding to the selected time interval. In an embodiment of the present invention, the first parameter comprises the server response time and the second parameter comprises server's RTT. It is noted that depending on the predetermined sampling rate, the retrieved data may include a single data point or a plurality of data points (i.e. time series data). Accordingly, at least in some embodiments, data analysis engine 112 may determine average values for the first and second parameters corresponding to the user selected time interval. Upon retrieving the requested data, data analysis engine 112 preferably presents a first graph representing said first and second performance related parameters. In various embodiments, the first graph may be presented as either horizontal bar graph (shown in FIG. 4) or as a vertical bar graph (shown in FIG. 5). It is noted that the first parameter (server response time) 404 will be shown as ART in the first problem domain (application) 304, while the second parameter (RTT) 406 will be shown as NRT in the second problem domain (network) 308.

At 708, data analysis engine 112 preferably determines one or more correlations between collected data sets. For instance, as previously mentioned, for networks using TCP protocols DTT value corresponds to a relationship between TCP zero window events and TCP retransmissions. Accordingly, this step may involve data analysis engine 112 determining a ratio that represents the number of TCP zero window events relative to the number of TCP retransmissions during the predetermined time interval. As another non-limiting example, step 708 may also involve analyzing constituent components of EURT to determine problem domain affinity and problem intensity for each performance issue being analyzed. It is to be understood, while the embodiments of the present invention illustrated by FIGS. 4, 5, 6A and 6B are shown herein with reference to analysis of networking environment, the description herein is not so limited. Rather the ratio between the TCP zero window events and TCP retransmissions is provided as an example of one type of correlations between the performance related parameters collected by data analysis engine 112. For example, if data analysis engine 112 monitors the performance of a water transportation system any suitable correlation between parameters influencing performance of the water transportation system may be utilized to present data to a user in a user-friendly output format.

At 710, data analysis engine 112 preferably generates a second graph based on one or more correlations determined at 708. For instance, continuing with the example of data analysis engine 112 monitoring performance of TCP-based network 100, at this step data analysis engine 112 may display the second graph as either horizontal bar graph 408 (shown in FIG. 4) or vertical bar graph 408 (shown in FIG. 5). As previously mentioned, the distances 410 and 412 to which the respective parts of the second graph extend from the vertical axis 306 (shown in FIG. 4) or from the horizontal axis 502 (shown in FIG. 5) depend on the ratio determined by data analysis engine 112 at step 708. As a non-limiting example, if at 708 data analysis engine 112 determines that the number of TCP zero window events which contribute to issues in the application problem domain 304 is approximately four times greater than the number of TCP retransmissions (contributing to network related issues), at 710, data analysis engine 112 positions the second bar graph 408 with respect to either the vertical axis 306 or the horizontal axis 502 in such a manner that a portion of the second graph 408 that is located within the first (application) problem domain 304 has the length 410 approximately four times greater than the length 412 of the portion located within the second (network) problem domain 308.

At 712, data analysis engine 112 may optionally generate one or more heat maps 610, 620 representing one or more network and/or application performance problems. In some embodiments, heat maps may be generated that reflect the performance values of any computing resource. Additionally, heat maps may function as visual representation of many performance values for a computing resource. The heat maps 610, 620 generated by data analysis engine 112 and shown in FIGS. 6A and 6B provide unique visual representations of analytics of computing resources that may assist system administrators in optimizing the performance of computing resources. In some embodiments, data analysis engine 112 may be integrated with a browser-based interface that includes visualizations that assist administrators in detecting performance issues across the communication network 100, in real-time. Heat maps 610, 620 may be generated from individual data points and may resemble a scatter plots.

The terms performance problems may be understood to include not only performance based metrics such as TCP zero window events, TCP retransmissions, bandwidth, and so forth, but also other types of metrics. The data analysis engine 112, at step 708, may discretely decompose measurements of a plurality of performance related parameters generated by computing resources that may run pluralities of programs, instances of programs, handle pluralities of requests for resources per second, or other complex computing tasks that generate event data.

The data analysis engine 112 may generate heat maps from collected measured data, or summaries of collected data. Each instance may include a mechanism for visual differentiation, such as color hue, that represents a performance issue. For example, an area of "high heat" 615 in FIG. 6A may be attributed to a significant network issue, and the "low heat" heat map representation 620 in FIG. 6B may indicate a relatively insignificant application performance problem. That is, each instance of heat map representation 615, 620 may be assigned an intensity value that represents a discrete performance problem that may be associated with the heat map representation 615, 620. In some embodiments, the data analysis engine 112 may combine heat map representation instances with different hues but belonging to the same problem domain 304, 308 to form a new hue. Thus, advantageously, data analysis engine 112 presents performance data (i.e., end-user response time data) in a format that enables end users to quickly determine the root cause of performance issues.

The flowchart and block diagrams in the FIG. 7 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A network analyzer device configured to couple to a computer network to retrieve data from the computer network to perform dynamic diagnosis of network operation relative to a user of the network, comprising;
   a data storage unit;
   a display providing a user interface; and
   a processor having instructions configured to cause the network analyzer device to:
      collect network data associated with measurements of a plurality of network performance parameters from the computer network for storage in the data storage unit wherein each of the plurality of performance parameters corresponds to a first and second performance problem domain, the plurality of performance parameters including at least a first parameter associated with the first performance problem domain, a second parameter associated with the second performance problem domain and a third parameter associated with the first and second performance problem domains;
      determine a ratio of a number of detected zero window events to a number of detected data packet retransmission attempts;
      transform the collected network data stored in data storage unit into graphical objects for dynamically presenting on the display first and second areas that represent the first and second performance problem domains, the first and second areas being separated by an axis;
      dynamically present on the display a first graph having a first region representing said first parameter that extends into the first area and having a second region representing said second parameter that extends into the second area, wherein the first and second regions extend in substantially opposing directions and a second graph representing the third parameter, the second graph having a first part that is positioned to extend from the axis into the first area and having a second part that is positioned to extend from the axis into the second area; and enable dynamic interaction between the user interface of the display and user such that user input provided on the user interface of the display dynamically adjusts a position of the second graph with respect to the axis by determining a length of the first part relative to the length of the second part based on the determined ratio, wherein said first, second and third parameters are components of the end user response time to perform dynamic network diagnostics.

2. The network analyzer device as recited in claim 1, wherein the first graph comprises a first horizontal bar and wherein the second graph comprises a second horizontal bar.

3. The network analyzer device as recited in claim 1, wherein the first graph comprises a wherein the first graph comprises a first vertical bar and wherein the second graph comprises a second vertical bar.

4. The network analyzer device as recited in claim 1, wherein the processor is further instructed to generate one or more heat maps representing one or more performance problems based on the analysis of the plurality of performance parameters.

5. The network analyzer device as recited in claim 4, wherein positions of the one or more heat maps with respect to the respective performance problem domains indicate affinity of the corresponding one or more performance problems.

6. The network analyzer device as recited in claim 4, wherein color hues of the one or more heat maps indicate intensity of the corresponding one or more performance problems.

7. The network analyzer device as recited in claim 1, wherein the collected measurements comprise time series data.

* * * * *